No. 692,507. Patented Feb. 4, 1902.
T. A. EDISON.
REVERSIBLE GALVANIC BATTERY.
(Application filed June 20, 1901.)

(No Model.) 2 Sheets—Sheet 1.

Witnesses: Inventor
Archibald Gray Reeve Thomas A. Edison
Jno. Robt Taylor by Dyer Edmonds & Dyer
Att'ys.

THE NORRIS PETERS CO., PHOTO-LITHO., WASHINGTON, D. C.

No. 692,507. Patented Feb. 4, 1902.
T. A. EDISON.
REVERSIBLE GALVANIC BATTERY.
(Application filed June 20, 1901.)
(No Model.) 2 Sheets—Sheet 2.

Witnesses: Inventor
Archibald␣Gray␣Reese Thomas A. Edison
Jno. Robt Taylor by Dyer Edmonds Dyer
Att'ys.

United States Patent Office.

THOMAS ALVA EDISON, OF LLEWELLYN PARK, NEW JERSEY, ASSIGNOR TO EDISON STORAGE BATTERY COMPANY, A CORPORATION OF NEW JERSEY.

REVERSIBLE GALVANIC BATTERY.

SPECIFICATION forming part of Letters Patent No. 692,507, dated February 4, 1902.

Application filed June 20, 1901. Serial No. 65,237. (No model.)

*To all whom it may concern:*

Be it known that I, THOMAS ALVA EDISON, a citizen of the United States, residing at Llewellyn Park, in the county of Essex and State of New Jersey, have invented a certain new and useful Improvement in Reversible Galvanic Batteries, (Case No. 1,063,) of which the following is a description.

My invention relates to improvements in reversible galvanic batteries of the type invented by me and described and claimed in my application for Letters Patent of the United States filed October 31, 1900, Serial No. 34,994, employing an electrolyte which remains unchanged during all conditions of use and which acts practically only as a conductor for the current and active materials carried by conducting-supports immersed in the electrolyte, which active materials at all times are entirely insoluble in the solution.

My object is to provide a battery of this type which shall be entirely permanent and of large capacity per unit of weight.

To this end the invention consists of a reversible galvanic cell of this character wherein finely-divided cadmium is employed as the oxidizable element and electrolytically-active oxid of nickel or cobalt is employed as the depolarizer. The nickel or cobalt oxid is raised to a superperoxid condition when charged. In discharging, the nickel or cobalt oxid will be reduced to a lower stage of oxidation, while the metallic cadmium will be oxidized. Cobalt is not considered as desirable for use as nickel, owing to its greater cost and to the fact that it is slightly soluble in an alkaline electrolyte. Preferably the conducting-supports for the active material are provided with perforated pockets or receptacles in which the active materials are contained under pressure. In order that the conducting capacity of the electrodes may be increased, the depolarizing material is preferably mixed with a flake-like inert conducting substance, such as flake graphite.

In order that the invention may be better understood, attention is directed to the accompanying drawings, forming part of this specification, and in which—

Figure 1:
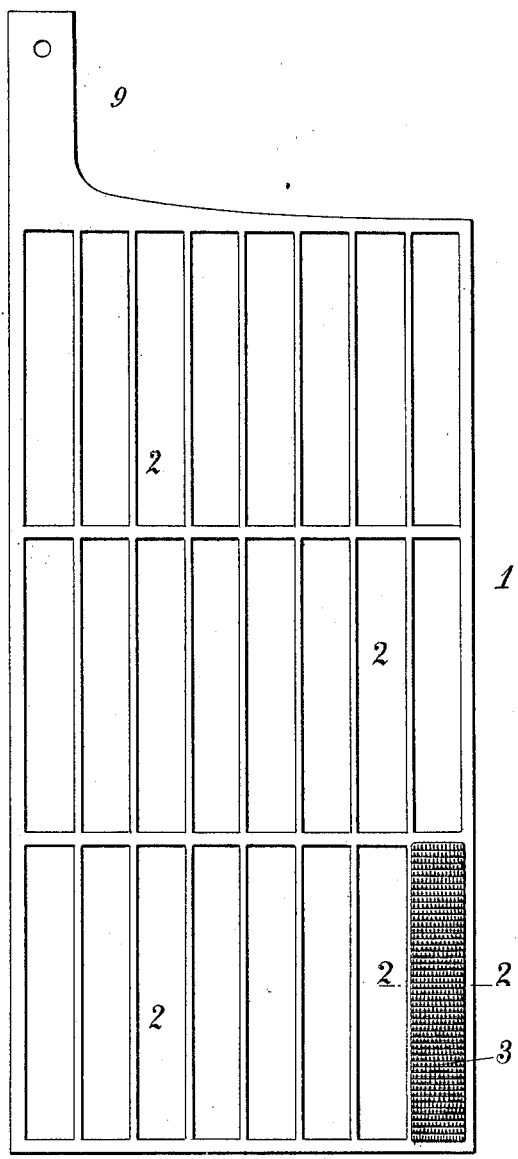
Figure 2:
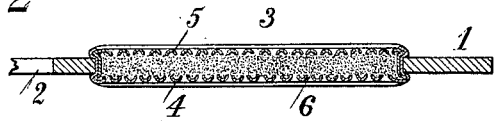
Figure 3:
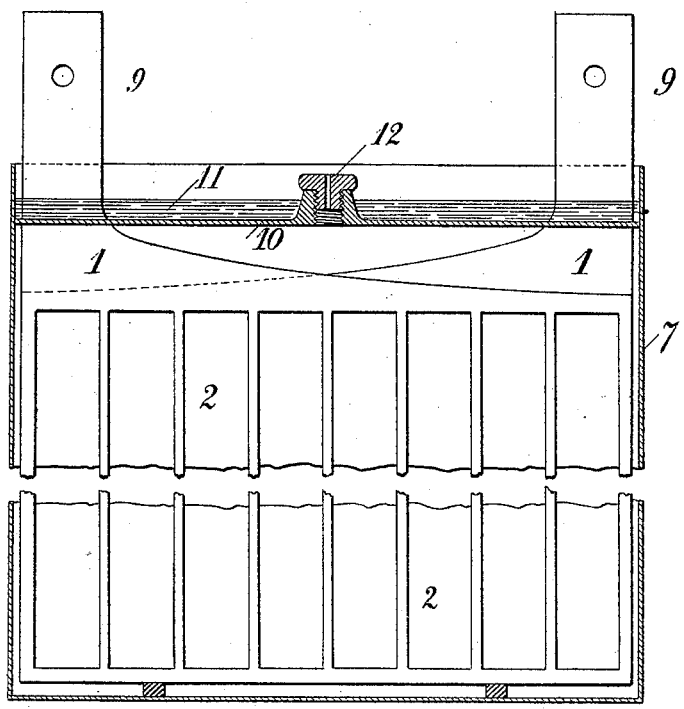
Figure 4:
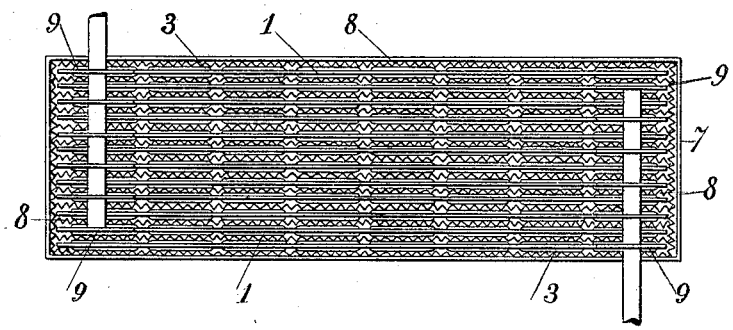

Figure 1 is a plan view of one of the plates for carrying the active materials, showing one of the pockets or receptacles in position; Fig. 2, a section on the line 2 2 of Fig. 1 on an enlarged scale; Fig. 3, a vertical section through the complete cell; and Fig. 4, a top view of the cell, showing the cover thereof removed.

Each support for the active materials is formed of a plate 1, having rectangular openings 2 2 therein. The plates 1 are composed of sheet iron or steel, carefully nickel-plated, so as to be unaffected by the alkaline solution. Into each of the openings 2 is inserted a pocket or receptacle 3, made of two sections 4 and 5. Each pocket is composed, preferably, of very thin sheet-steel, high in carbon, so as to be very elastic, and carefully nickel-plated. The walls of each pocket are perforated, preferably by passing the sheets before being stamped into shape between male and female die-rolls, whereby the metal will be displaced at each opening and an internally-projecting bur will be formed, which extends into the active material to increase the conductivity thereof. The active material in the form of blocks 6 is inserted in the smaller section 4 of each pocket, and the section 5 thereof is then placed, like the cover of a box, over the section 4, and both sections, with the intermediate block of active material, are inserted in one of the openings 2, after which a crimping pressure is applied to crimp the edges of the sections over upon the plate 1, to thereby hold the pockets or receptacles firmly in place and also to bind the sections thereof tightly together. The plates carrying the oxidizable and depolarizing materials, respectively, are obviously alternately arranged and are placed within a suitable jar or case 7, being separated by perforated corrugated hard-rubber partitions 8. Each plate is formed with a conducting-lug 9, which extends through the top 10 of the case, after which a layer 11 of paraffin or analogous material is poured upon the top to close any crevices around the lugs 9. The cover 10 of the case is provided with a threaded cap 12, having a gas-vent therein.

In obtaining finely-divided cadmium in desirable form for use as the oxidizable element of a reversible galvanic cell I preferably employ an electrodeposition process, as I describe in my application filed October 31, 1900, Serial No. 34,994. A very thin platina wire is used as the cathode, a plate of metallic cadmium as the anode, and a weak solution of sulfate of cadmium as the electrolyte. By employing a strong current in the electrolyte with a small platina wire as the cathode, as explained, the cadmium will be deposited thereon in its metallic state, exceedingly finely divided and filamentary in form and of great purity. The deposited finely-divided cadmium is detached from time to time from the cathode and is washed in water to remove any adhering sulfate of cadmium, after which it is formed into blocks 6 and received between the sections 4 and 5 of certain of the pockets or receptacles, as explained, which are finally secured in position within the openings 2 of the proper plates 1.

The depolarizing material is either a hydrated oxid of nickel or of cobalt, preferably the former, for reasons explained. When nickel is used, I preferably obtain the hydrate in non-colloidal form (as I describe in my application filed May 9, 1901, Serial No. 59,512) by adding to a boiling solution of nitrate of nickel a sufficient quantity of magnesium hydroxid to precipitate the whole of the nickel as nickel hydroxid—i. e., $Ni(OH)_2$—the whole being then thrown into water, in which it settles almost immediately. By decanting the water and adding fresh water six or eight times and decanting after each addition the hydroxid is obtained very free from impurities. Afterward the excess of water is filtered off and the hydroxid is then dried. If desired, the green hydroxid so obtained may be further oxidized to the peroxid state to reduce the tendency to increase in bulk in use by passing chlorin gas through a receptacle filled with the dried hydroxid, the action of the chlorin on the hydrate being to oxidize the latter, producing hydrochloric acid, which combines with a portion of the hydroxid and forms chlorid of nickel, which is washed out by percolation and used again to give fresh hydrate. Finally, the hydrated peroxid is dried and is ready for use. The dried hydrated peroxid or the dried green hydroxid is then mixed with flake-graphite or other flake-like inert conducting material in the proportion of six parts of the peroxid or hydroxid to four parts of the graphite. The mixture is then slightly moistened with water or a solution of potassic hydroxid and spread out on a glass plate and by means of a glass or porcelain roller pressed into a thin sheet. By means of a spatula the sheet is detached from the glass and broken up and rolled again. This operation is repeated a number of times until the finely-divided oxid covers nearly the whole surface of the graphite particles. The mass is then molded into blocks 6, which are received between the sections 4 and 5 of the pockets, after which the latter are secured in position within the openings 2 of the plates 1, as explained.

If instead of a hydrated oxid of nickel the corresponding oxid of cobalt is employed as a depolarizer, I may proceed, as I describe in my application filed March 1, 1901, Serial No. 49,452, by first precipitating the monoxid or black hydrated dioxid of cobalt in the usual way, washing the precipitate free from the products of the reaction, filtering off the liquid, and drying the precipitate. The resulting dried hydrated oxid is then powdered very fine and is mixed with flake-graphite or other inert flake-like conducting material in the proportion of about seven parts, by weight, of the powdered hydrate and three parts, by weight, of the flake-graphite, the mass being moistened with a small quantity of a strong solution of potassic hydroxid and molded into blocks 6, which are received between the sections 4 and 5 of the pockets or receptacles, and the latter are finally secured in place within the openings 2 of the plates 1.

The electrolyte employed with my improved battery is a solution of potassic hydroxid and water varying from ten to twenty-five per cent. When in a discharged condition, the metallic cadmium will be oxidized and the oxid of nickel or cobalt will be reduced to a low condition of oxidation. In charging, the oxid of cadmium is reduced to the metallic state, and the oxid of nickel or cobalt is raised to a superperoxid condition of oxidation—that is to say, to a higher stage of oxidation than the peroxid state.

I do not claim herein the depolarizer *per se* nor the generic combination of such depolarizer with an oxidizable material, the electrolyte being unchanged during all conditions of use, since claims thereon are made in my application of even date, Edison No. 1,061.

By the expression "oxid of a magnetic metal other than iron," as used by me in the appended claims, I mean the oxid of nickel or of cobalt or a combination of such oxids.

Having now described my invention, what I claim as new, and desire to secure by Letters Patent, is as follows:

1. In a reversible galvanic battery, the combination of an electrolyte which remains unchanged during all conditions of use, a conducting-support, finely-divided metallic cadmium carried by said support, a second conducting-support, and an electrolytically-active oxid of a magnetic metal other than iron carried by the second support, substantially as set forth.

2. In a reversible galvanic battery, the combination of an electrolyte which remains unchanged during all conditions of use, a conducting-support, finely-divided metallic cadmium carried by said support, a second conducting-support, and a mixture of electrolytically-active oxid of a magnetic metal other than iron and a flake-like conducting material carried by the second support, substantially as set forth.

3. In a reversible galvanic battery, the combination of an electrolyte which remains unchanged during all conditions of use, a conducting-support, finely-divided metallic cadmium carried by said support, a second conducting-support, and a mixture of electrolytically-active oxid of a magnetic metal other than iron and flake-graphite carried by the second support, substantially as set forth.

4. In a reversible galvanic battery, the combination of an electrolyte which remains unchanged during all conditions of use, a conducting-support, finely-divided metallic cadmium carried by said support, a second conducting-support having perforated pockets or receptacles, and an electrolytically-active oxid of a magnetic metal other than iron carried within said pockets or receptacles, substantially as set forth.

5. In a reversible galvanic battery, the combination of an electrolyte which remains unchanged during all conditions of use, a conducting-support, finely-divided metallic cadmium carried by said support, a second conducting-support having perforated pockets or receptacles, and a mixture of electrolytically-active oxid of a magnetic metal other than iron and a flake-like inert conducting material carried within said pockets or receptacles, substantially as set forth.

6. In a reversible galvanic battery, the combination of an electrolyte which remains unchanged during all conditions of use, a conducting-support, finely-divided metallic cadmium carried by said support, a second conducting-support having perforated pockets or receptacles, and a mixture of electrolytically-active oxid of a magnetic metal other than iron and flake-graphite carried within said pockets or receptacles, substantially as set forth.

7. In a reversible galvanic battery, the combination of an electrolyte which remains unchanged during all conditions of use, a conducting-support having perforated pockets or receptacles, finely-divided metallic cadmium carried by said pockets or receptacles, a second conducting-support, and an electrolytically-active oxid of a magnetic metal other than iron carried by the second support, substantially as set forth.

8. In a reversible galvanic battery, the combination of an electrolyte which remains unchanged during all conditions of use, a conducting-support having perforated pockets or receptacles, finely-divided metallic cadmium carried by said pockets or receptacles, a second conducting-support having perforated pockets or receptacles, and an electrolytically-active oxid of a magnetic metal other than iron carried within the pockets or receptacles of the second support, substantially as set forth.

9. In a reversible galvanic battery, the combination of an electrolyte which remains unchanged during all conditions of use, a conducting-support, finely-divided cadmium in filamentary form carried by said support, a second conducting-support, and an electrolytically-active oxid of a magnetic metal other than iron carried by the second support, substantially as set forth.

10. In a reversible galvanic battery, the combination of an electrolyte which remains unchanged during all conditions of use, a conducting-support, finely-divided cadmium in filamentary form carried by said support, a second conducting-support having perforated pockets or receptacles, and an electrolytically-active oxid of a magnetic metal other than iron carried within said pockets or receptacles, substantially as set forth.

This specification signed and witnessed this 17th day of June, 1901.

THOMAS ALVA EDISON.

Witnesses:
FRANK L. DYER,
RICHD. N. DYER.